US012679180B2

(12) United States Patent
Kanai

(10) Patent No.: US 12,679,180 B2
(45) Date of Patent: Jul. 14, 2026

(54) VEHICLE DOOR SASH STRUCTURE

(71) Applicant: SUBARU CORPORATION, Tokyo (JP)

(72) Inventor: Isao Kanai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/974,184

(22) Filed: Dec. 9, 2024

(65) Prior Publication Data

US 2025/0256553 A1 Aug. 14, 2025

(30) Foreign Application Priority Data

Feb. 13, 2024 (JP) ................................. 2024-019661

(51) Int. Cl.
*B60J 5/04* (2006.01)
*B60J 10/86* (2016.01)
(52) U.S. Cl.
CPC ............. *B60J 5/0402* (2013.01); *B60J 10/86* (2016.02)
(58) Field of Classification Search
CPC ................................ B60J 5/0402; B60J 10/86
See application file for complete search history.

(56) References Cited

U.S. PATENT DOCUMENTS

| | | | |
|---|---|---|---|
| 6,039,384 A * | 3/2000 | Schulte ................. | B60J 5/0402 |
| | | | 296/146.5 |
| 2010/0115851 A1* | 5/2010 | Nakao ................... | B60J 5/0402 |
| | | | 49/502 |
| 2017/0080783 A1* | 3/2017 | Noda ..................... | B60J 5/0402 |
| 2020/0276890 A1* | 9/2020 | Kimura ................. | B60J 5/0404 |
| 2022/0032748 A1* | 2/2022 | Kimura ................. | B60J 5/0402 |

FOREIGN PATENT DOCUMENTS

| | | |
|---|---|---|
| JP | 2004-338603 A | 12/2004 |
| JP | 2016-055704 A | 4/2016 |

* cited by examiner

*Primary Examiner* — Gregory J Strimbu
(74) *Attorney, Agent, or Firm* — McGinn IP Law Group, PLLC

(57) ABSTRACT

A vehicle door sash structure comprises a door sash body provided above a side door body of a vehicle door, a bracket that is configured to support the door sash body and is provided between the door sash body and an inner door panel of the side door body, a retainer joined to the door sash body, a weather strip attached to the inner door panel and the retainer, and a reinforcement support that is attached to the bracket, that projects upward to exceed a height of a waist of the inner door panel, and that is joined to the door sash body.

18 Claims, 12 Drawing Sheets

UPPER

LEFT   FRONT

REAR   RIGHT

LOWER

UPPER

LEFT   FRONT

REAR   RIGHT

LOWER

UPPER

LEFT — FRONT

REAR — RIGHT

LOWER

UPPER

LEFT — FRONT
REAR — RIGHT

LOWER

FRONT

LEFT ← → RIGHT

REAR

FRONT

LEFT ←——→ RIGHT

REAR

VEHICLE DOOR SASH STRUCTURE

CROSS-REFERENCE TO RELATED APPLICATIONS

The present application claims priority from Japanese Patent Application No. 2024-019661 filed on Feb. 13, 2024, the entire contents of which are hereby incorporated by reference.

BACKGROUND

The disclosure relates to a vehicle sash door structure comprising a door sash provided with a retainer for attaching a weather strip door along a window frame.

Types of vehicle side door include a sash door, a sashless door, and a full door. A sash door comprises a door sash of a frame constituting a window frame above a waist, which serves as the window shoulder of a side door body. A sashless door consists just of a side door body, without a door sash of a window frame. A full door has a configuration resultant from integrally press molding the door sash itself and the door body.

Among these types of side door, a sash door is sometimes used as a door assembly that is commonly employed for different vehicles for reducing capital investment etc. because the door sash of a sash door can be mass produced through roll forming. For example, Japanese Unexamined Patent Application Publication (JP-A) No. 2016-55704 discloses a technique relating to a vehicle door frame, and particularly to the structure of joint between a door sash forming a window frame and a bracket fixed to a door panel. Also, Japanese Unexamined Patent Application Publication (JP-A) No. 2004-338603 for example discloses a technique relating to a vehicle door with a sash that permits the reduction in the scraping processing (machine processing), which follows the extrusion molding of a vehicle door when forming the vehicle door.

Incidentally, each type of vehicle employs a sash door differing in specification, design, etc. Some types of vehicle may thus employ a long door sash, leading to reduced rigidity in window frames (sash portions). However, using a thicker sheet metal to increase the rigidity of a door sash prevents the weight saving of the sash door, which is problematic.

Also, the retainer of a sash door is not disposed up to the waist of the side door body. The retainer is used for attaching a weather strip door, which a general door sash has. Thereby, a sash door involves a concave height difference between the retainer and the inner door panel.

Accordingly, a sash door commonly includes an EPT-sealer, which is a sealing material for filling a concave height difference at a spot having the seal lip of the weather strip door, on the surface of the door sash. However, an EPT-sealer provided on the surface of the door sash at the concave portion formed between the retainer and the inner door panel of a sash door does not guarantee the pressure bonding of the seal lip of the weather strip door, leading to a risk that the reduced drip-proofness causes water to enter the cabin of the vehicle.

Further, a door sash to which a retainer has been attached is sometimes subject to so-called electrodeposition secondary dripping at its mating portion with the retainer. Electrodeposition secondary dripping is a phenomenon in which a coating material flows out of a mating portion and adheres to a neighboring portion during electrodeposition coating. There is an issue that the electrodeposition secondary dripping occurring in a retainer is to be treated through polishing followed by recoating, which reduces the yield ratio.

SUMMARY

An aspect of the disclosure provides a vehicle sash door structure comprising: a door sash body provided above a side door body for a vehicle; a bracket that is configured to support the door sash body, and is provided between the door sash body and an inner door panel of the side door body; a retainer provided to the door sash body; a weather strip door attached to the inner door panel and the retainer; and a reinforcement support that is provided to the bracket, that projects upward to exceed a height of a waist of the inner door panel, and that is joined to the door sash body, wherein the retainer comprises a plate shaped part that is configured to fill a gap formed, by a thickness of the bracket, between the inner door panel and the door sash body at a position at which the weather strip door passes.

DETAILED DESCRIPTION

Figure 1:
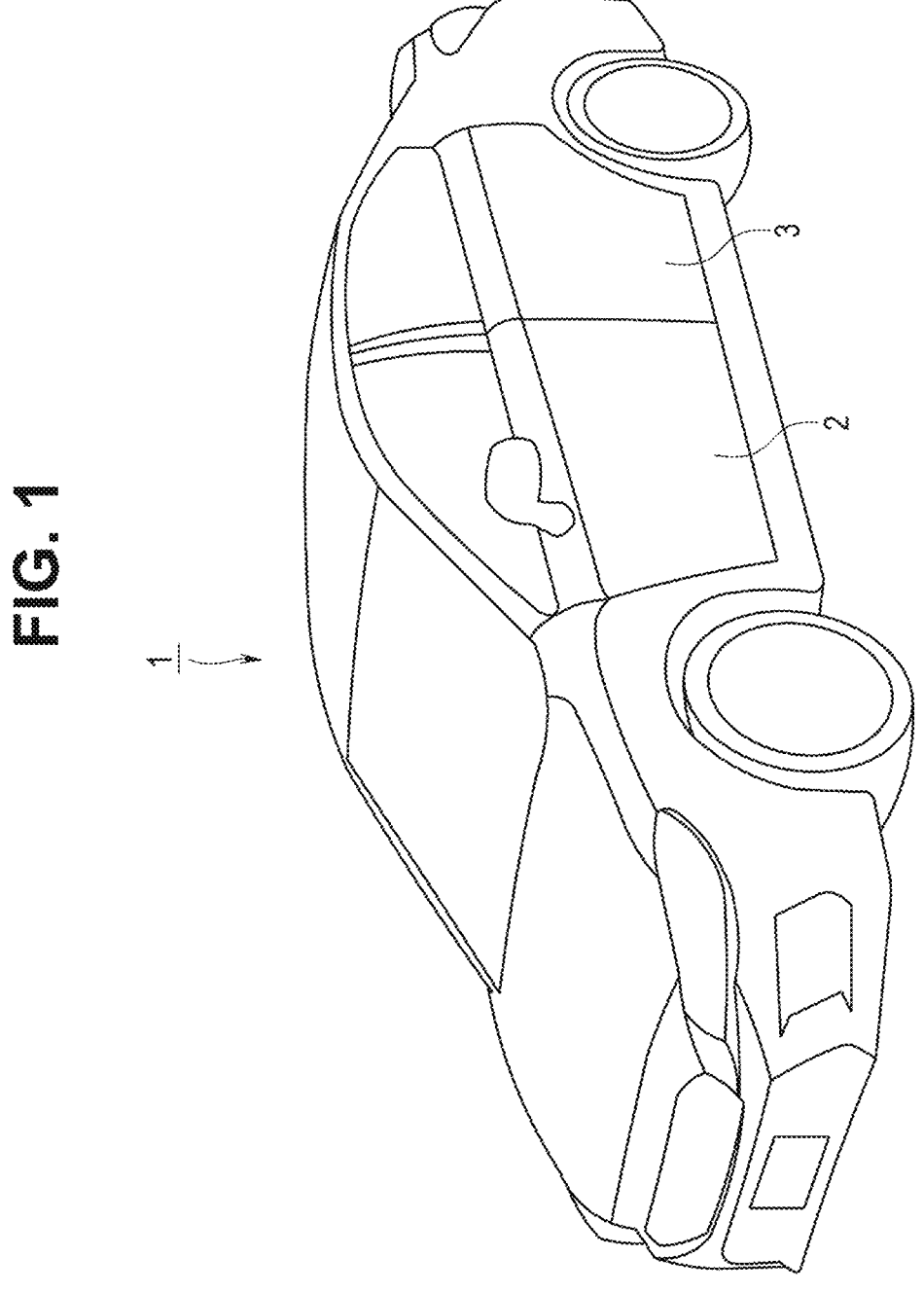
FIG. 1 is a perspective view illustrating a vehicle.

It is desirable to provide a vehicle sash door structure that can increase the rigidity without preventing the weight saving, can increase the drip-proofness, and can suppress the reduction in the yield ratio.

Detailed explanations will hereinafter be given to embodiments of a vehicle sash door structure according to an aspect of the disclosure, with reference to the drawings. The drawings referred to in the following description illustrate their constituents with different scales such that each of the constituents has a size that allows understanding in the drawings.

Accordingly, the embodiments of the disclosure are not limited solely to the numbers, shapes, ratios in size, or relative positional relationships of the constituents illustrated in the drawings. In addition, the right and left directions in the following explanations and the drawings are with respect to the direction in which the front of a vehicle is seen from the cabin of the vehicle.

A vehicle 1 such as an automobile etc. illustrated in FIG. 1 generally comprises front side doors 2 and rear side doors 3 on its lateral sides in this example when it is a four-door car (or a five-door car with a rear gate). If the vehicle 1 is a two-door car, it generally comprises just front side doors 2 on the lateral sides.

Figure 2:
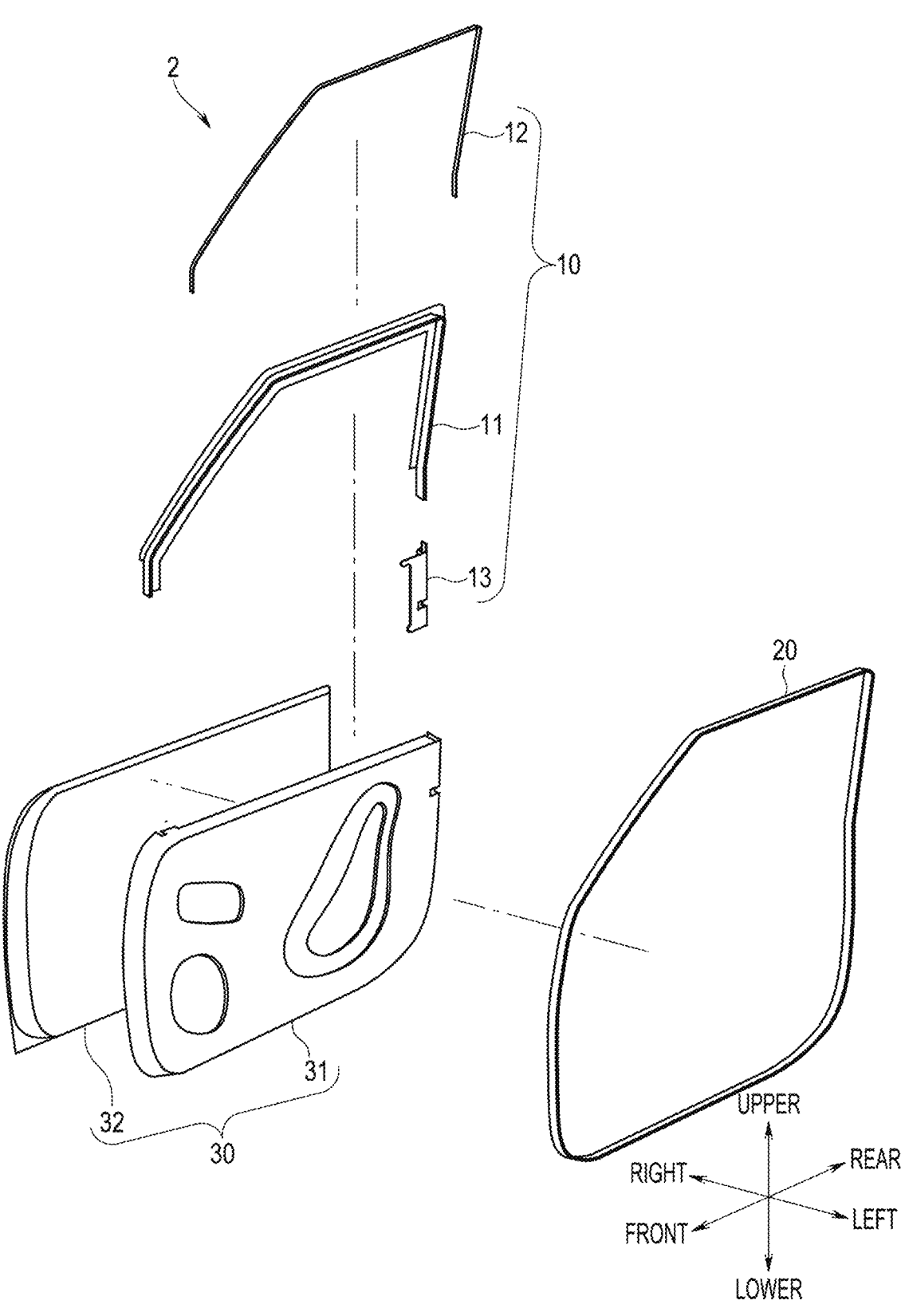
FIG. 2 is an exploded perspective view illustrating a configuration of a front side door.

While the front side door 2 is exemplified in the explanations for a vehicle sash door structure according to embodiments of the disclosure, a similar configuration can apply to the rear side door 3. FIG. 2 illustrates the front side door 2 on the right side of the vehicle 1, and FIG. 3 illustrates the front side door 2 on the left side of the vehicle 1.

Figure 3:
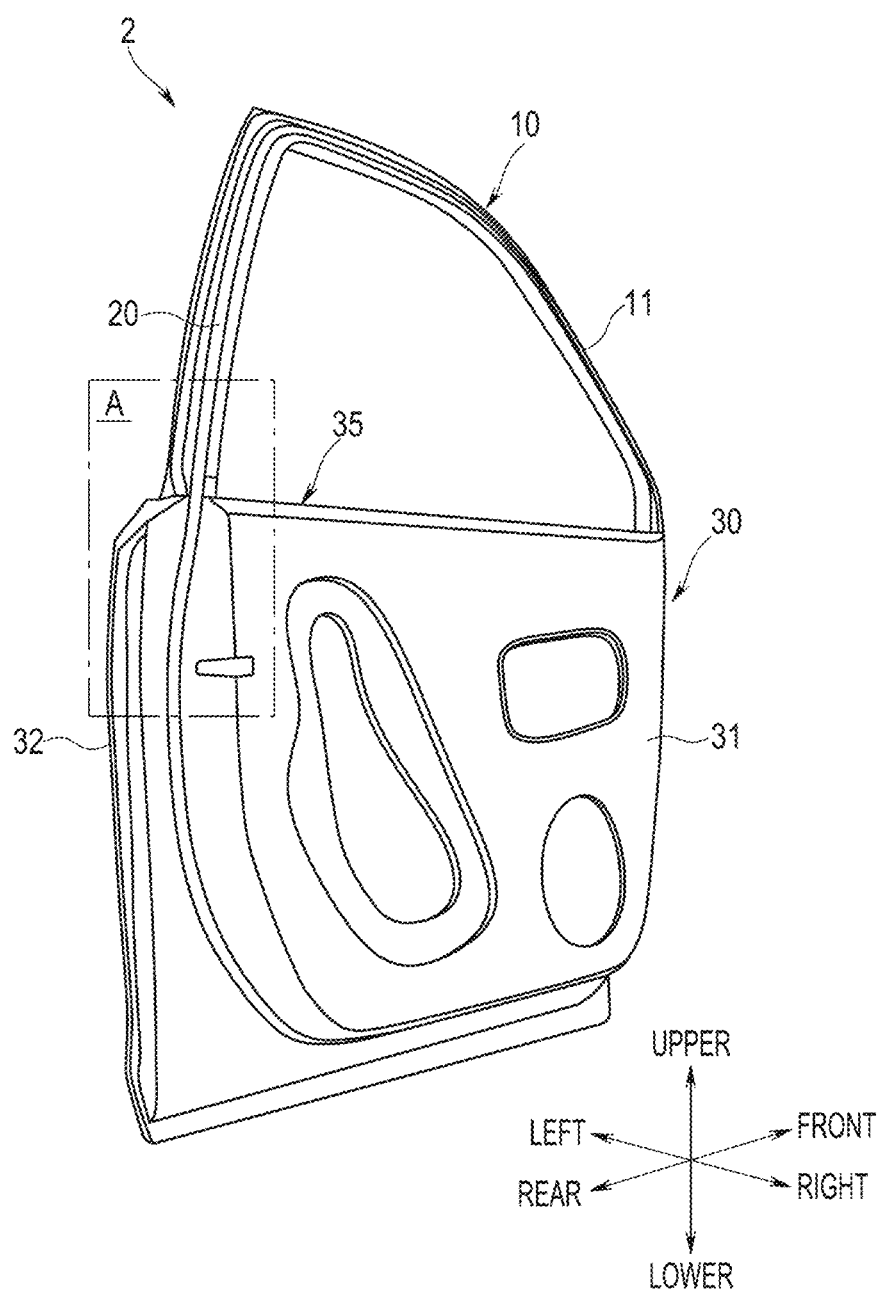
FIG. 3 is a perspective view illustrating the configuration of the front side door.

As illustrated in FIG. 2 and FIG. 3, the front side door 2 comprises a door sash unit 10, a weather strip door 20, and a side door body 30. The door sash unit 10 comprises a door sash body 11, a retainer 12, and a bracket 13.

The door sash body 11 is provided above the side door body 30, and constitutes the window frame of the front side door 2. The door sash body 11 is a metalworking component resulting from applying stepwise curving on a long sheet metal through roll forming. The door sash body 11 in this example has a shape resulting from tracing the sides of a trapezoid except the bottom side.

The retainer 12 is joined to the door sash body 11 at a prescribed interval through welding such as roll spot welding. The retainer 12 is a retainment component that attaches the weather strip door 20 to the door sash body 11. The retainer 12 is also a metalworking component resulting from roll forming. In addition, the retainer 12 in this example also has a shape, substantially similar to the door sash body 11, resulting from tracing the sides of a trapezoid except the bottom side.

Figure 4:
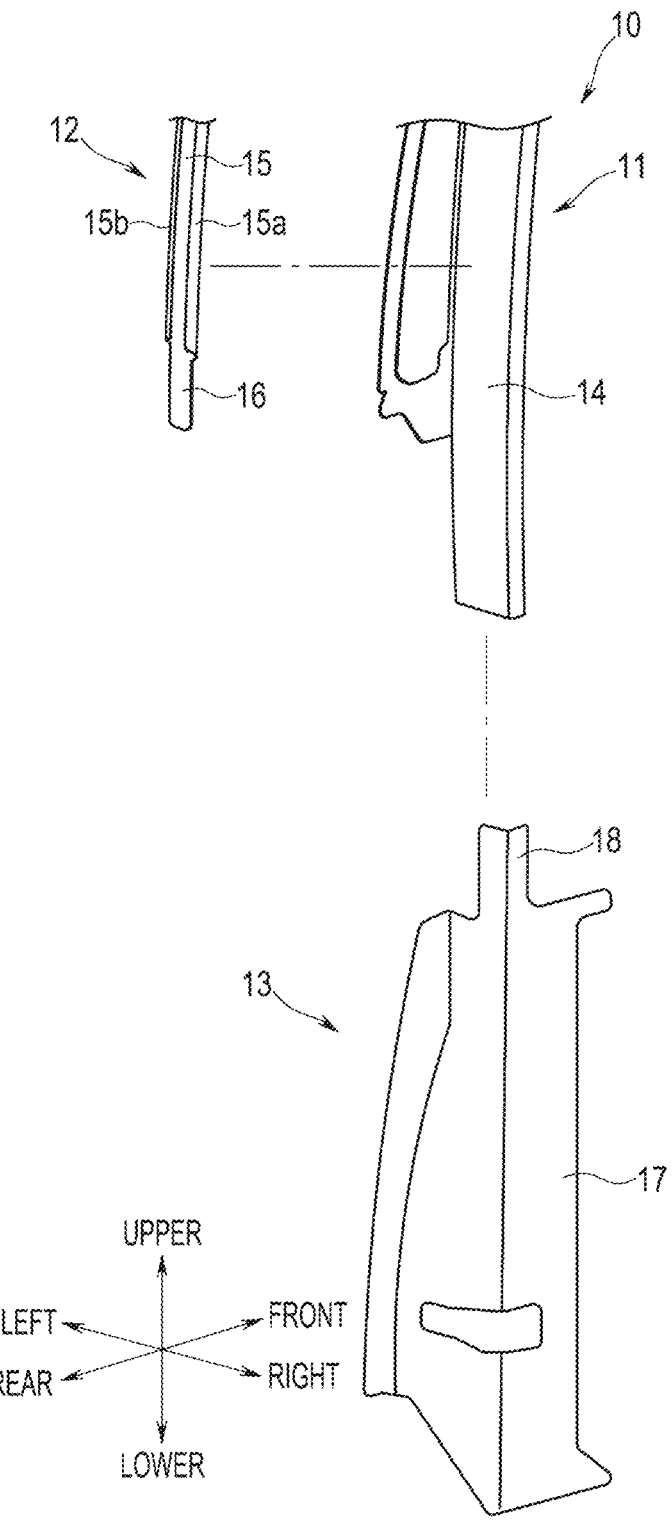
FIG. 4 is an exploded perspective view partially illustrating a joint configuration of a door sash unit.

The retainer 12 comprises hooks 15a and 15b, each of which has its both widthwise edges curved toward a surface part 15 (see FIG. 4). The hooks 15a and 15b are locking members that lock and retain the weather strip door 20. Also, the retainer 12 comprises, below the hooks 15a and 15b, a plate shaped part 16 extending over a prescribed length.

The bracket 13 is a metal part for causing the lower end part of the door sash body 11 to be fixed to and supported on the side door body 30. The bracket 13 is a metal component having a substantially-crank-shaped section. The bracket 13 comprises a reinforcement support 18 that has a substantially-L-shaped section projecting upward from the corner of a bracket body 17 (see FIG. 4).

The present embodiment is exemplifying a configuration in which the door sash body 11 has its rear-side lower end part alone fixed to and supported on the side door body 30 through the bracket 13. However, the disclosure is not limited to this embodiment, and the door sash body 11 may also have its front-side lower end part fixed to and supported on the side door body 30 through the bracket 13.

The weather strip door 20 is formed of for example a resin such as polyvinyl chloride, polyvinyl chloride (PVC), polypropylene (PP), etc., and a rubber material etc. The weather strip door 20 in this example has a looped shape.

The weather strip door 20 is locked and retained by the retainer 12 attached to the door sash body 11. The weather strip door 20 is held on the side door body 30 at multiple positions through clips (not illustrated). Thereby, the weather strip door 20 is attached to the front side door 2.

This weather strip door 20 prevents rain water and dust from entering the cabin with the front side door 2 closed. The weather strip door 20 is an elastic member that promotes absorption of impact accompanying the closing and opening of the front side door 2 and increases the sound insulating property in the cabin.

The side door body 30 comprises an inner door panel 31 on the inner side of the vehicle and an outer door panel 32 on the outer side of the vehicle. The inner door panel 31 and the outer door panel 32 are formed by applying press working on a thin cold-rolled steel sheet. The inner door panel 31 and the outer door panel 32 of the side door body 30 have their edges finished with a hemming process etc.

Hereinafter, the vehicle sash door structure according to the present embodiment will be explained in detail. The vehicle sash door structure is the portion of area A enclosed by the dashed-dotted line in FIG. 3 in the rear-side part at which the side door body 30 and the door sash body 11 are joined to each other. In addition, the vehicle sash door structure can apply also to the front-side part at which the side door body 30 and door sash body 11 are joined to each other.

Figure 5:
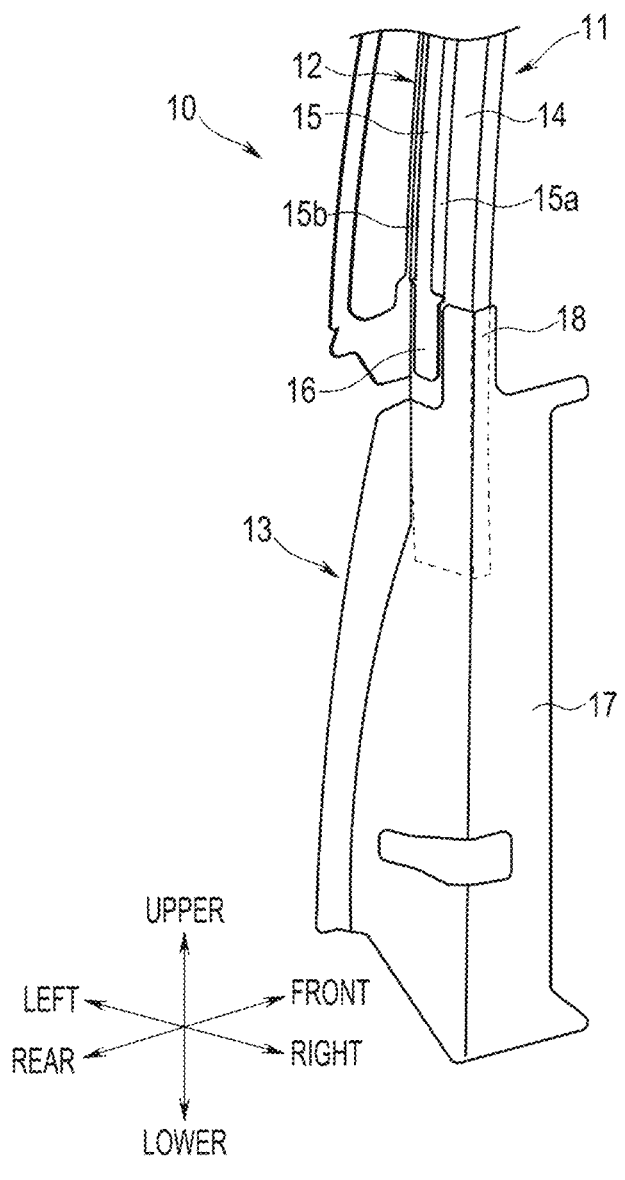
FIG. 5 is a perspective view partially illustrating the joint configuration of the door sash unit.

First, the retainer 12 and the door sash body 11 are joined along a surface part 14 through roll spot welding etc. as illustrated in FIG. 4. Then, the rear-side lower side of the door sash body 11 with the retainer 12 joined to it is joined to the upper side of the bracket 13 through arc welding etc. as illustrated in FIG. 5.

For this joint, the bracket 13 is joined to the door sash body 11 through arc welding etc. such that the reinforcement support 18 does not overlap with the retainer 12. In other words, the joint is achieved such that the reinforcement support 18 of the bracket 13 and the plate shaped part 16 of the retainer 12 are disposed side by side in the lateral direction of the surface part 14 of the door sash body 11 in order to avoid overlapping between them.

The front side door 2 comprises the plate shaped part 16 joined to an outer side of the door sash body 11 in a widthwise direction of the vehicle 1 and comprises the reinforcement support 18 joined to an inner side of inner side of the door sash body 11 in the widthwise direction of the vehicle 1.

Figure 6:
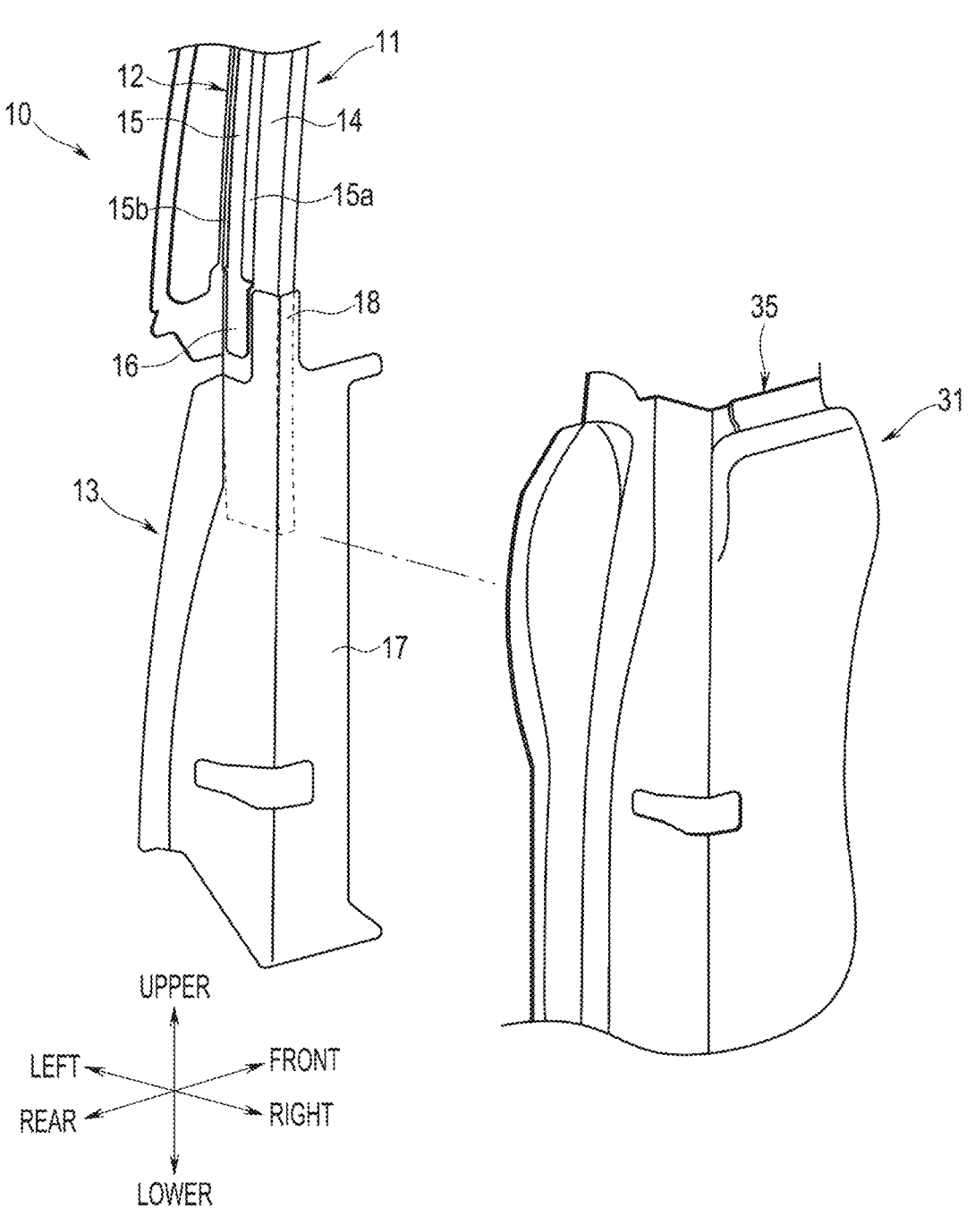
FIG. 6 is an exploded perspective view partially illustrating a joint configuration of the door sash unit and an inner door panel.
Figure 7:
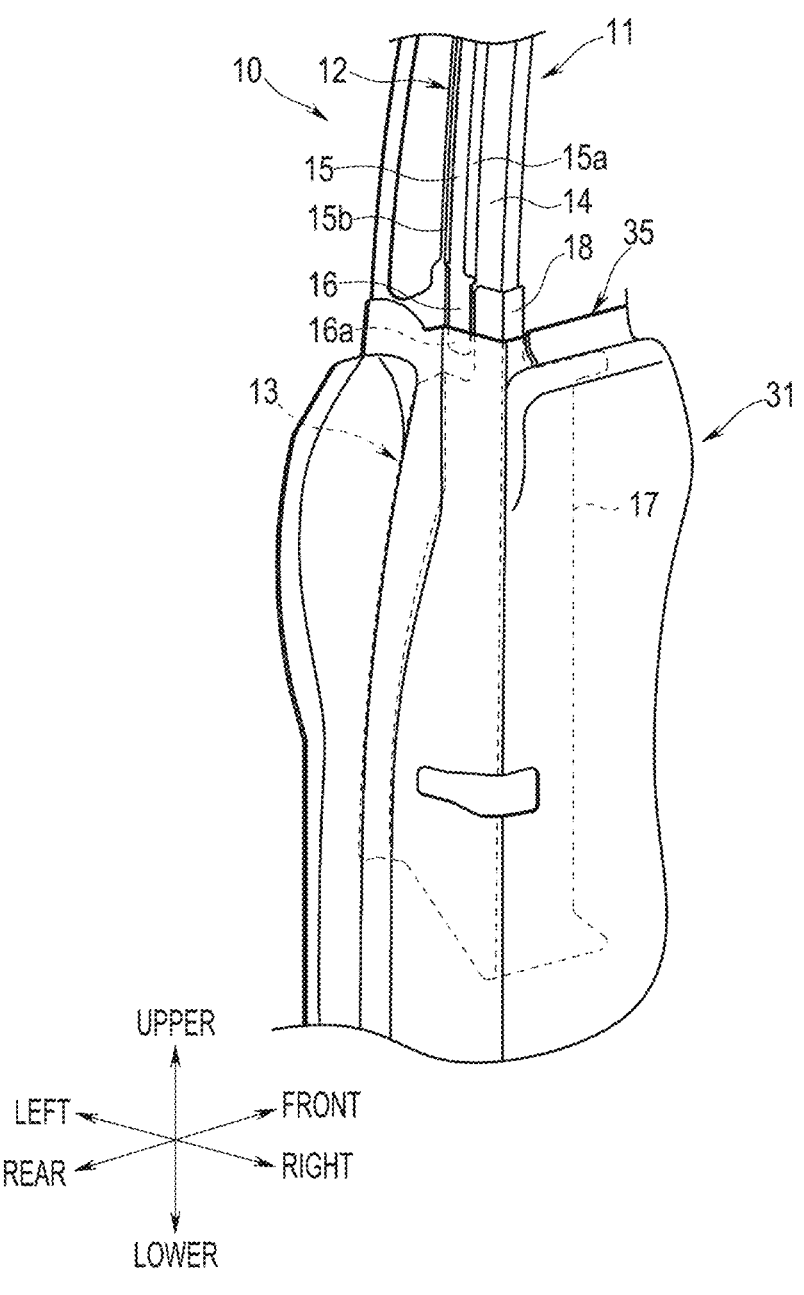
FIG. 7 is a perspective view partially illustrating the joint configuration of the door sash unit and the inner door panel.

As illustrated in FIG. 6 and FIG. 7, the bracket 13 is joined to the inner door panel 31 through arc welding etc. in the door sash unit 10 to which the door sash body 11, the retainer 12 and the bracket 13 are joined. In other words, the bracket 13 is provided between the door sash body 11 and the inner door panel 31 to cause the door sash body 11 to be fixed to and supported on the inner door panel 31.

In this state, the door sash unit 10 is joined such that a lower end part 16a, which is a prescribed part of the plate shaped part 16 of the retainer 12, is covered by the inner door panel 31. Also, the door sash unit 10 is joined to the inner door panel 31 such that the reinforcement support 18 of the bracket 13 projects upward to exceed the height of a waist 35 of the inner door panel 31, which serves as the window shoulder of the side door body 30.

In other words, the lower end part 16a of the retainer 12 of the door sash unit 10 is covered by the inner door panel 31 such that the lower end part 16a is positioned below the waist 35 of the inner door panel 31 in order to be concealed. Also, in the door sash unit 10, the reinforcement support 18 of the bracket 13 is positioned and exposed above the waist 35 of the inner door panel 31.

The front side door 2 receives electrodeposition coating after receiving a paint sealer process (not illustrated) on its boundaries of the door sash unit 10 and the inner door panel 31, etc. The paint sealer process is for rust prevention, prevention of entry of water, etc.

Figure 8:
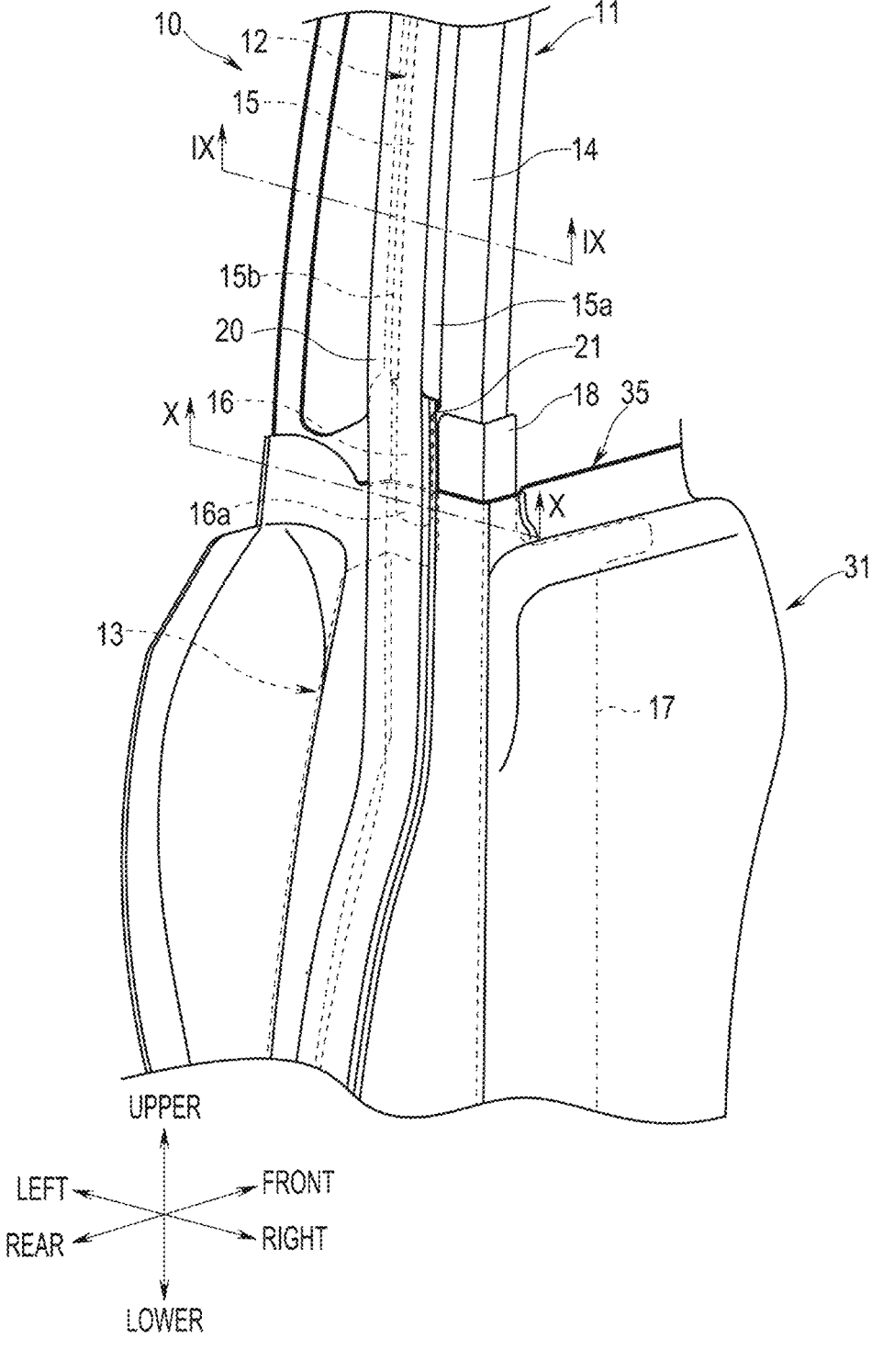
FIG. 8 is a perspective view partially illustrating a state in which a weather strip door has been attached to a retainer and the inner door panel.
Figure 9:
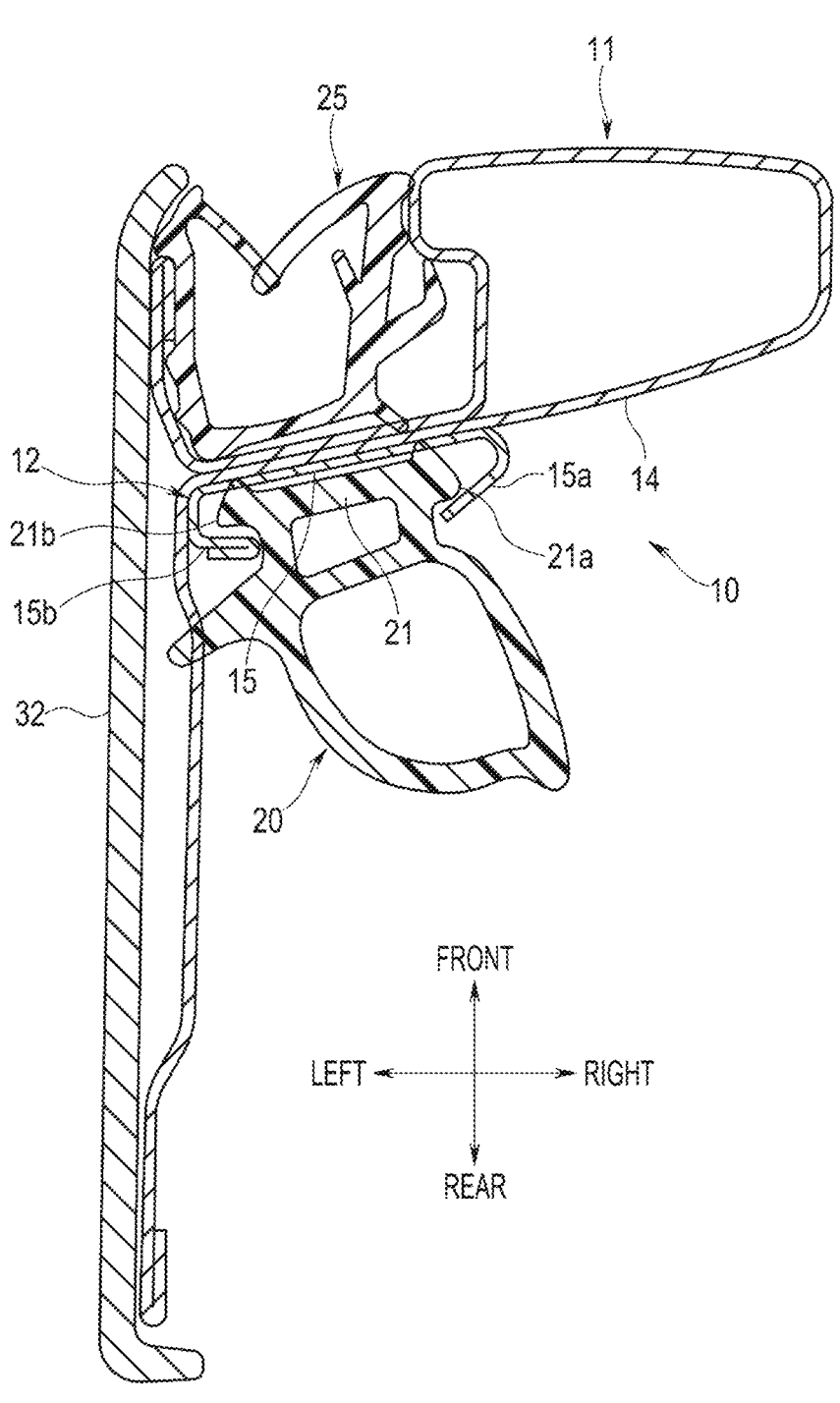
FIG. 9 is a sectional view along IX-IX of FIG. 8.

In the front side door 2, the weather strip door 20 is attached to the door sash unit 10 and the inner door panel 31 as illustrated in FIG. 8. As illustrated in FIG. 9, the weather strip door 20 is locked and retained, with each of a left convex 21a and a right convex 21b of the seal lip 21 engaged with the hooks 15a and 15b of the retainer 12, respectively.

The door sash body 11 is provided with a door glass run 25 on the side opposite to the weather strip door 20. This door glass run 25 is attached to the sliding part (not illustrated) of the window glass.

Also, the weather strip door 20 is held with multiple clips (not illustrated) inserted into holes formed at multiple positions on the inner door panel 31.

Figure 10:
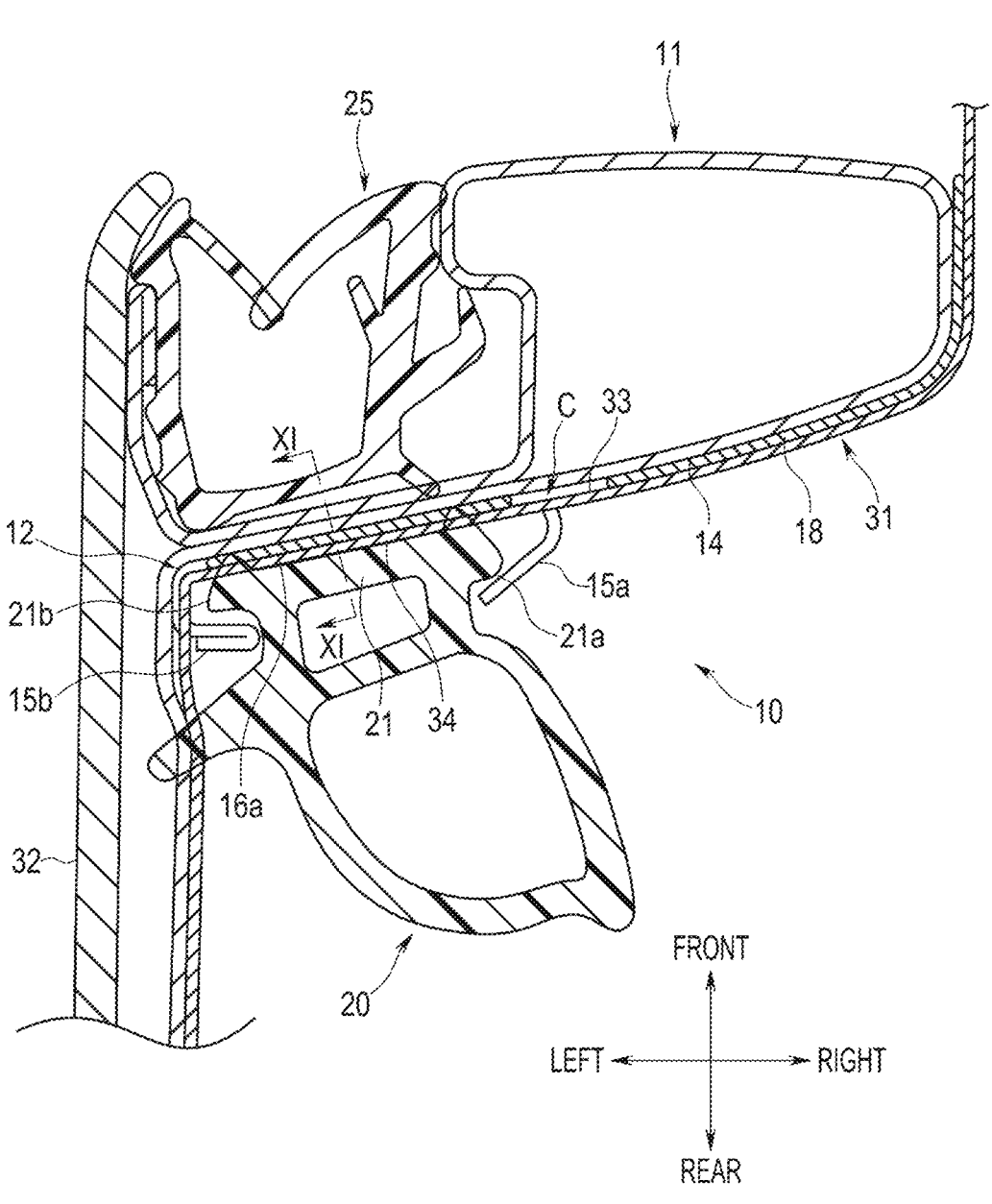
FIG. 10 is a sectional view along X-X of FIG. 8.
Figure 11:
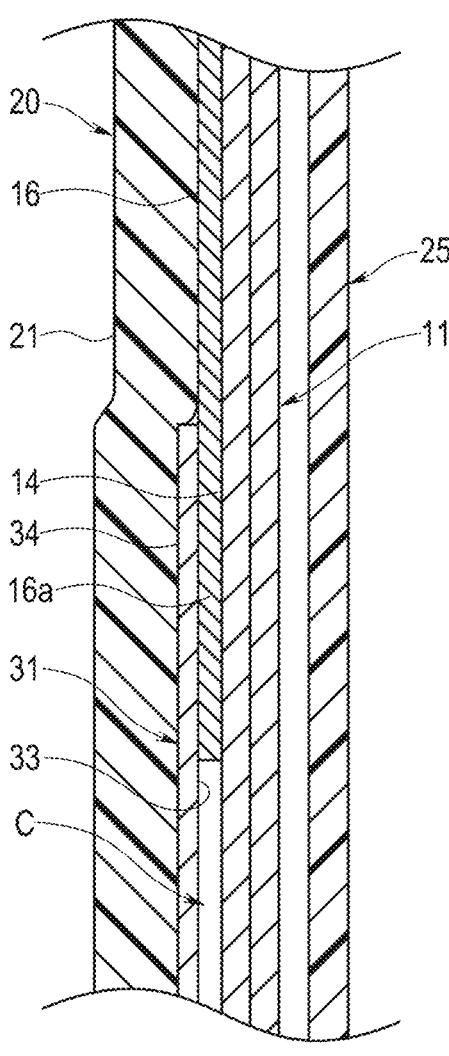
FIG. 11 is a sectional view along XI-XI of FIG. 10.

As described above, in the vehicle sash door structure according to the present embodiment, the lower end part 16a of the retainer 12 is inserted into gap C formed by the thickness of the bracket 13 between the surface part 14 of the door sash body 11 and a back-side surface part 33 of the inner door panel 31 as illustrated in FIG. 10 and FIG. 11.

In other words, the retainer 12 is disposed such that the lower end part 16a of the plate shaped part 16 fills gap C at the position at which the weather strip door 20 passes. In some embodiments, the plate shaped part 16 of the retainer 12 and the bracket 13 have an equal thickness such that no gap occurs between the door sash body 11 and the inner door panel 31.

The weather strip door 20 is pressure bonded to the surface part 15 of the retainer 12, with each of the convexes 21a and 21b of a seal lip 21 engaged with the hooks 15a and 15b of the retainer 12, respectively.

The weather strip door 20 is disposed along the plate shaped part 16 of the retainer 12, and is held on the inner door panel 31 and clips (not illustrated). Thereby, the weather strip door 20 tightly fits with a surface part 34 of the inner door panel 31.

As described above, in the vehicle sash door structure, the lower end part 16a of the retainer 12 is disposed such as to fill gap C of the inner door panel 31 and the door sash body 11. The vehicle sash door structure thus has a configuration having no concave height difference in the area from the retainer 12 to the inner door panel 31 through which the seal lip 21 of the weather strip door 20 passes. Thereby, the vehicle sash door structure does not need an EPT-sealer, which is a sealing material for filling a concave height difference and which was conventionally been provided to the door sash body 11.

Also, the vehicle sash door structure has its seal lip 21 of the weather strip door 20 in contact with an area from the plate shaped part 16 of the retainer 12 to the surface part 34 of the inner door panel 31, thereby preventing floating that causes insufficient contact. Thus, the vehicle sash door structure can increase drip-proofness, and can prevent water from entering the cabin.

Further, the vehicle sash door structure employs a configuration in which the retainer 12 has its lower end part 16a under the inner door panel 31. Accordingly, even when electrodeposition coating involves electrodeposition secondary dripping at the lower end part 16a from a mating portion between the door sash body 11 and the retainer 12, the drip is under the side door body 30 such that the drip is concealed.

This eliminates the necessity of performing maintenance such as polishing followed by recoating on the vehicle sash door structure when electrodeposition secondary dripping occurs between the door sash body 11 and the retainer 12. Thereby, the vehicle sash door structure can suppress the reduction in the yield ratio.

Also, the vehicle sash door structure employs a configuration comprising the reinforcement support 18, which is an upward extension of the bracket 13 exceeding the height of the waist 35 of the inner door panel 31 serving as the window shoulder of the side door body 30. This results in a longer span over which the bracket 13 supports the door sash body 11, thereby increasing the rigidity of the door sash unit 10 in the vehicle sash door structure.

In other words, the span becomes shorter over which the door sash body 11 is supported on the bracket 13, thereby increasing the rigidity of the door sash unit 10. This eliminates the necessity for a large thickness of the door sash body 11, thereby achieving an increased rigidity of the door sash unit 10 without preventing the weight saving.

As described above, the vehicle sash door structure according to the present embodiment can increase the rigidity and the drip-proofness without preventing the weight saving and can suppress the reduction in the yield ratio.

Figure 12:
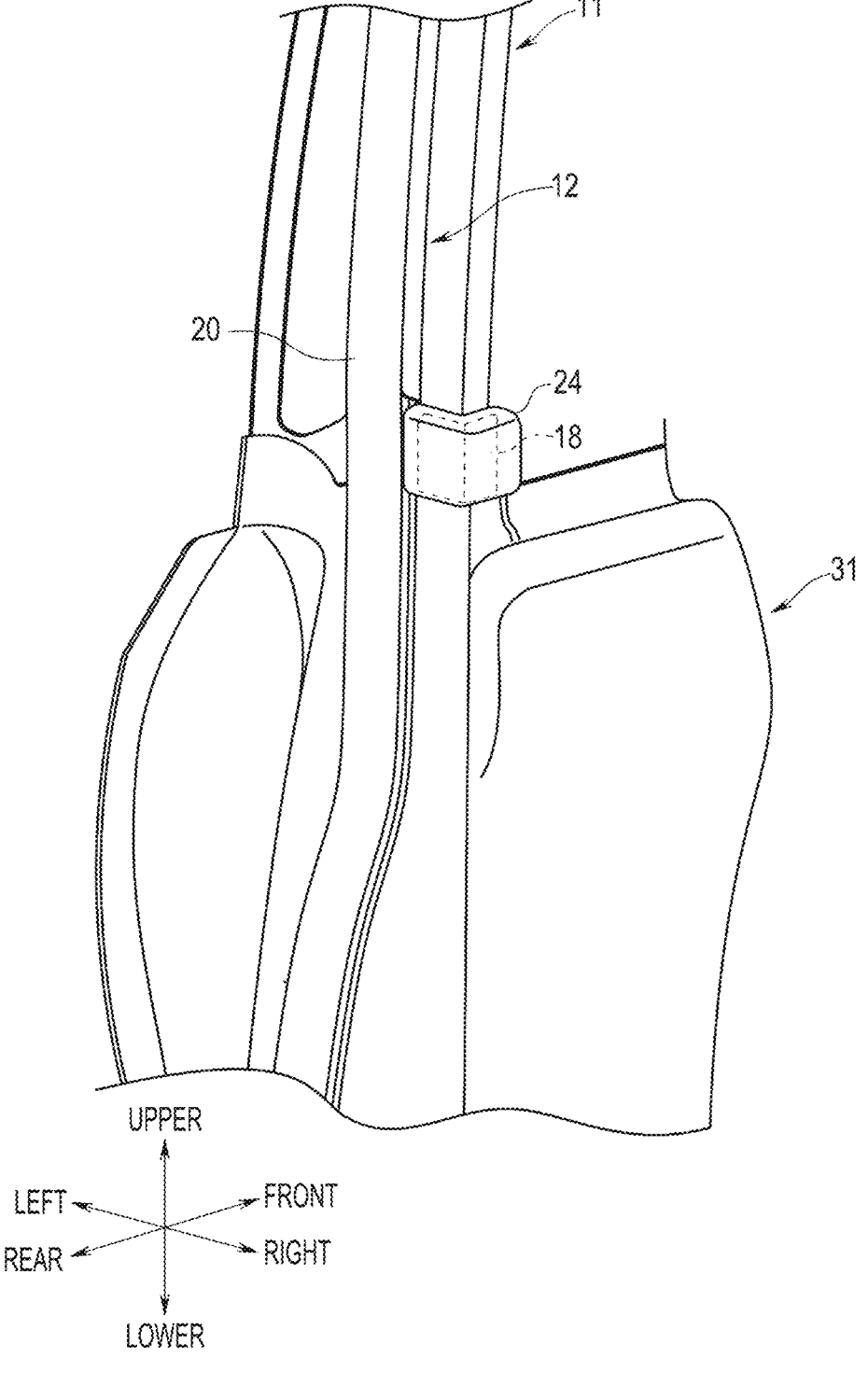
FIG. 12 is a perspective view partially illustrating a state in which the weather strip door comprising a cover for covering a reinforcement support of a bracket has been attached to the retainer and the inner door panel.

In addition, a cover 24 that covers the reinforcement support 18 of the bracket 13 may be provided as illustrated in FIG. 12. This cover 24 may be formed of a resin, a rubber material, etc. integrally with the weather strip door 20.

The disclosure described in the above embodiments is not limited to the embodiments, and various modifications can be made within a scope not departing from the spirit of the disclosure when implementing the disclosure. Further, the above embodiments encompass disclosure at various stages, and various disclosure can be extracted from appropriate combinations of the disclosed constituents.

For example, when the above stated problem can be solved and the above stated effect can be achieved even if some constituents are omitted from among all the constituents disclosed in the above embodiments, a configuration resulting from such omission of the constituents can be extracted as disclosure.

According to the disclosure, it is possible to provide a vehicle sash door structure that can increase the rigidity without preventing the weight saving, can increase the drip-proofness, and can suppress the reduction in the yield ratio.

The invention claimed is:

1. A vehicle door sash structure comprising:
   a door sash body provided above a side door body of a vehicle door;
   a bracket that is configured to support the door sash body, and is provided between the door sash body and an inner door panel of the side door body;
   a retainer joined to the door sash body;
   a weather strip attached to the inner door panel and the retainer; and
   a reinforcement support that is joined to the bracket, that projects upward to exceed a height of a waist of the inner door panel, and that is joined to the door sash body,
   wherein the retainer comprises a plate shaped part that is configured to fill a gap between the inner door panel and the door sash body and the gap is positioned between the inner door panel and the door sash body underneath the weather strip, the gap being formed by a thickness of the bracket and extends in a vehicle width direction, and
   wherein the plate shaped part has a lower end part that is covered by the inner door panel.

2. The vehicle door sash structure according to claim 1, wherein the retainer and the reinforcement support are disposed side by side on a surface part of the door sash body.

3. The vehicle door sash structure according to claim 1, wherein the retainer is joined to the door sash body through welding.

4. The vehicle door sash structure according to claim 3, wherein the welding comprises roll spot welding.

5. The vehicle door sash structure according to claim 1, wherein the retainer comprises hooks configured to lock and retain the weather strip.

6. The vehicle door sash structure according to claim 5, wherein the hooks have widthwise edges curved toward a surface part of the retainer to engage with the weather strip.

7. The vehicle door sash structure according to claim 5, wherein the plate shaped part is disposed below the hooks and extends over a prescribed length of the retainer.

8. The vehicle door sash structure according to claim 5, wherein the weather strip comprises a seal lip having left and right convexes configured to engage with the hooks of the retainer.

9. The vehicle door sash structure according to claim 1, wherein the bracket has a cross-section having a stepped configuration.

10. The vehicle door sash structure according to claim 1, wherein the retainer and the bracket have an equal thickness.

11. The vehicle door sash structure according to claim 1, wherein the reinforcement support has an L-shaped cross-section projecting upward from a corner of the bracket.

12. The vehicle door sash structure according to claim 1, wherein the plate shaped part is joined to an outer side of the door sash body, and wherein the reinforcement support is joined to an inner side of the door sash body.

13. The vehicle door sash structure according to claim 1, wherein the lower end part of the plate shaped part is positioned below the waist of the inner door panel to be concealed from view.

14. The vehicle door sash structure according to claim 1, wherein the reinforcement support is exposed above the waist of the inner door panel.

15. The vehicle door sash structure according to claim 1, wherein the weather strip is formed of a material selected from the group consisting of polyvinyl chloride, polypropylene, and rubber.

16. The vehicle door sash structure according to claim 1, further comprising a door glass run attached to a side of the door sash body opposite to the weather strip, the door glass run being configured to engage with a sliding part of a window glass.

17. The vehicle door sash structure according to claim 1, further comprising a cover configured to cover the reinforcement support, wherein the cover is formed integrally with the weather strip.

18. A vehicle door sash structure comprising:

a door sash body provided above a side door body of a vehicle door;

a bracket that is configured to support the door sash body, and is provided between the door sash body and an inner door panel of the side door body;

a retainer joined to the door sash body;

a weather strip attached to the inner door panel and the retainer; and a reinforcement support that is joined to the bracket, that projects upward to exceed a height of a waist of the inner door panel, and that is joined to the door sash body, wherein the retainer comprises a plate shaped part that is configured to fill a gap between the inner door panel and the door sash body and the gap is positioned between the inner door panel and the door sash body underneath the weather strip, the gap being formed by a thickness of the bracket and extends in a vehicle width direction, and wherein the plate shaped part has a lower end part that is covered by the inner door panel to conceal the lower end part from view.

* * * * *